United States Patent Office 2,859,153
Patented Nov. 4, 1958

2,859,153

PROCESS FOR THE HIGH-FREQUENCY WELDING OF CELLULAR BODIES OF THERMOPLASTIC MATERIALS

Conrad Zucht, West-Berlin-Siemensstadt, Germany, assignor to Reinhard Staeger, Koniz, near Bern, Switzerland No Drawing. Application June 28, 1955
Serial No. 518,645

Claims priority, application Switzerland July 15, 1954

15 Claims. (Cl. 154—126.5)

This invention relates to a process for carrying out high-frequency welding operations on thermoplastic cellular bodies having open or closed cells.

The bonding of thermoplastic cellular bodies having open or closed cells, such as sponge-like and foamed bodies, could not be carried out satisfactorily by hitherto known methods. When using adhesives, hard seams were formed which in addition had a low strength, and in particular it was not possible for soft cellular material to be treated in this manner, since thereby hard places were formed in the bonded material. The electric welding processes, which are quite suitable for bonding compact thermoplastic cellular bodies, produced unsatisfactory results because an extensive destruction of the cells was caused at the welded places by heat and pressure.

A high-frequency welding process has now been discovered, by means of which it is possible to produce welded joints in cellular bodies of thermoplastic plastics such as polyvinylchloride or synthetic rubber without the said disadvantages. Both foils and also thick cellular bodies can be bonded in this way.

The process consists in that the surfaces to be welded are provided with a very thin layer of a dipolar substance having a high dielectric constant, the two surfaces are placed one against the other, preferably with light pressure, and the electrodes are applied with very light to no pressure on both sides of the material to be welded and along the weld seam. The current is applied to electrodes which have been thus positioned and the welding operation is carried out.

The substance having a high dielectric constant is preferably dissolved in a readily volatile solvent, which is caused to evaporate after the solvent has been applied to the surfaces to be welded. In this manner, it is possible to produce a film of any desired thinness of the dipolar substance on the surfaces to be welded, i. e. of a substance which has a dipole moment between 1 and 4. It is necessary to evaporate the solvent in order to avoid bubble formation upon heating, which bubble formation could cause irregularities in the welded layer.

Examples of substances having a high dielectric constant are: sodium acetate, sodium phosphate and ammonium phosphate, tartaric acid, maleic acid, oxalic acid, acetic acid, nitric acid, hydrogen iodide, phosphoric acid, $\epsilon$-amino-caproic acid, $\beta$-amino-butyric acid, and also divalent and polyvalent alcohols, such as glycerine, methyl-ethyl-propyl glycol and monochlorohydrin. Such substances have a dipole moment between 1 and 4. Substances having a low or no dipole moment, such as benzine or benzene, cannot be employed. Moreover, substances having good conductivity, such as metal powders, and completely polar substances, such as NaCl, KCl, KBr, which have a dipole moment higher than 6, cannot be considered owing to their good conductivity. Substances which have the required polarity but are volatile and therefore do not form a layer on the welding areas, such as water, alcohols, acetone, low boiling esters, cannot be used by themselves but are used as solvents. The substances are expediently employed in the form of solutions of up to 30% strength. The preferred solvent is water, although alcohol, esters, and acetone may also be employed.

It is of importance for the utility of the process that the plasticisers are not "leached out" from the plastic by the solvents, so that it is preferred to use substances in which the plasticizers are not soluble non-solvents, such as water.

The electrodes preferably consist of copper and have, for example, a circular or oval cross-section. They may, however, also be formed with a groove or fillet in order to direct the high-frequency currents in the form of a beam, for example for thick welds. The shape is, however, to a large extent determined by the surfaces to be welded.

The welding time is about 1–5 seconds, according to the thickness of the cellular body, the nature of the welding material and the current intensity which is employed.

One form of the welding process is illustrated by the following example:

The abutting edges of two sheets of a cellular body with a thickness of 2 cm. and consisting of a mixture of 50% of polyvinyl chloride and 50% of plasticiser are coated with a 10% aqueous sodium acetate solution. After the coating has dried, the said edges of the sheets are placed with light pressure one against the other and then the electrodes are applied to the material to be welded along the weld seam and without use of pressure. The electrodes are connected to a high-frequency generator of the HFG 117 kw. 2/1 type with a constant valve-output rating of 2 kw. and an operating frequency of 27 megacycles and the high frequency current is transmitted for about 1½ seconds. A firm, soft and durable welding of the sheets is obtained.

What I claim is:

1. The process for the high-frequency welding of cellular bodies of thermoplastic materials, which comprises providing the surfaces to be welded with a thin layer of a non-volatile substance having a high dielectric constant with a dipole moment between 1 and 4, placing the surfaces to be welded one against the other and applying the electrodes along the weld seam on both sides without exerting any substantial pressure on the material being welded.

2. The process for the high-frequency welding of cellular bodies of synthetic rubber, which comprises providing the surfaces to be welded with a thin layer of a non-volatile substance having a high dielectric constant with a dipole moment between 1 and 4, placing the surfaces to be welded one against the other and applying the electrodes along the weld seam on both sides without exerting any substantial pressure on the material being welded.

3. The process for the high-frequency welding of closed-cell cellular bodies of polyvinyl chloride, which comprises providing the surfaces to be welded with a thin layer of a non-volatile substance having a high dielectric constant with a dipole moment between 1 and 4, placing the surfaces to be welded one against the other and applying the electrodes along the weld seam on both sides without exerting any substantial pressure on the material being welded.

4. The process according to claim 1, wherein sodium acetate is used as the substance having a high dielectric constant.

5. The process according to claim 1, wherein methyl glycol is used as the substance having a high dielectric constant.

6. The process according to claim 1, wherein ethyl glycol is used as the substance having a high dielectric constant.

7. The process according to claim 1, wherein glycerine is used as the substance having a high dielectric constant.

8. The process according to claim 1, wherein chlorohydrin is used as the substance having a high dielectric constant.

9. The process for the high-frequency welding of cellular bodies of thermoplastic materials, which comprises dissolving a non-volatile substance having a high dielectric constant with a dipole moment between 1 and 4 in a solvent, coating the surfaces to be welded with this solution and allowing them to dry, then placing the surfaces thus treated one against the other and applying the electrodes along the weld seam on both sides without the said electrodes exerting any substantial pressure on the material being welded.

10. The process according to claim 9, wherein water is used as the solvent for the substance having a high dielectric constant.

11. The process according to claim 9, wherein acetone is used as the solvent for the substance having a high dielectric constant.

12. In a process of forming a cellular body having a soft weld seam from cellular body portions consisting essentially of a material selected from the group consisting of synthetic rubber and polyvinylchloride, the steps of applying to surface portions of cellular body portions a thin layer of a non-volatile substance having a high dielectric constant with a dipole moment between 1 and 4, said non-volatile substance being selected from the group consisting of sodium acetate, methyl glycol, ethyl glycol, glycerine and chlorohydrin; placing said surface portions in contact with each other; and subjecting said contacting surface portions to high frequency welding without exerting any substantial pressure thereon, whereby a firm, soft and durable weld seam is formed, thereby obtaining a unitary cellular body.

13. In a process of forming a cellular body having a soft weld seam from cellular body portions consisting essentially of polyvinylchloride, the steps of applying to surface portions of cellular body portions a thin layer of sodium acetate as a non-volatile substance having a high dielectric constant with a dipole moment between 1 and 4; placing said surface portions in contact with each other; and subjecting said contacting surface portions to high frequency welding without exerting any substantial pressure thereon, whereby a firm, soft and durable weld seam is formed, thereby obtaining a unitary cellular body.

14. In a process of forming a cellular body having a soft weld seam from cellular body portions consisting essentially of a material selected from the group consisting of synthetic rubber and polyvinylchloride, the steps of applying to surface portions of cellular body portions a solution of a non-volatile substance having a high dielectric constant with a dipole moment between 1 and 4, said non-volatile substance being selected from the group consisting of sodium acetate, methyl glycol, ethyl glycol, glycerine and chlorohydrin, dissolved in a liquid selected from the group consisting of water and acetone; allowing said solution to dry, thereby forming on said surface portions a thin layer of said non-volatile substance; placing said surface portions in contact with each other; and subjecting said contacting surface portions to high frequency welding without exerting any substantial pressure thereon, whereby a firm, soft and durable weld seam is formed, thereby obtaining a unitary cellular body.

15. In a process of forming a cellular body having a soft weld seam from cellular body portions consisting essentially of polyvinylchloride, the steps of applying to surface portions of cellular body portions a solution of sodium acetate as a non-volatile substance having a high dielectric constant with a dipole moment between 1 and 4, dissolved in water; allowing said solution to dry, thereby forming on said surface portions a thin layer of said non-volatile substance; placing said surface portions in contact with each other; and subjecting said contacting surface portions to high frequency welding without exerting any substantial pressure thereon, whereby a firm, soft and durable weld seam is formed, thereby obtaining a unitary cellular body.

References Cited in the file of this patent

UNITED STATES PATENTS 2,721,600    Perryman _____ Oct. 25, 1955